United States Patent [19]
Kalsi

[11] Patent Number: 4,484,753
[45] Date of Patent: Nov. 27, 1984

[54] ROTARY SHAFT SEAL
[75] Inventor: Manmohan S. Kalsi, Houston, Tex.
[73] Assignee: NL Industries, Inc., New York, N.Y.
[21] Appl. No.: 462,464
[22] Filed: Jan. 31, 1983
[51] Int. Cl.³ .............................................. F16J 15/16
[52] U.S. Cl. ..................................................... 277/27
[58] Field of Search ............................. 277/3, 27, 102

[56] References Cited
U.S. PATENT DOCUMENTS

| | | |
|---|---|---|
| 2,867,462 | 1/1959 | Nielsen . |
| 3,449,021 | 5/1966 | Palen . |
| 3,659,662 | 5/1972 | Dicky . |
| 3,666,333 | 5/1972 | Dicky . |
| 3,831,954 | 8/1974 | Longfellow . |
| 3,940,151 | 2/1976 | Phillips .................................. 277/27 |
| 3,971,450 | 7/1976 | Fox . |
| 4,091,591 | 4/1978 | Fox . |
| 4,168,936 | 9/1979 | Scheller et al. ........................ 277/27 |
| 4,222,445 | 9/1980 | Vadetsky et al. . |
| 4,256,189 | 3/1981 | Fox . |
| 4,260,032 | 4/1981 | Fox . |

OTHER PUBLICATIONS

Kalsi, M. S. and G. A. Fazekas, "Feasibility Study of a Slanted 'O-ring' as a High Pressure Rotary Seal", ASME Paper No. 72-WA/DE-14, (1972).

Kalsi, M. S., "Elastohydrodynamic Lubrication of Offset O-ring Rotary Seal", ASME Paper No. 80-C2-/Lub-7, (1980).

Primary Examiner—Robert I. Smith
Attorney, Agent, or Firm—Browning, Bushman, Zamecki & Anderson

[57] ABSTRACT

The present invention is directed to a rotary shaft seal assembly and, more particularly, to an assembly including a continuous, annular, but axially variable seal for providing hydrodynamic lubrication between the seal and rotating shaft. The seal assembly uses differential pressures to maintain the seal compressed as it wears. The present system is particularly useful in drilling motors utilizing the movement of drilling fluid under pressure to operate the motor parts and thereby to drive a drill bit. The abrasive drilling fluid environment in a borehole is detrimental to the moving parts in such a system, and especially destructive to the bearings and seals. The present system utilizes a sealing member arranged in a continuous, annular, but axially variable path between the rotating shaft and housing of such a motor. Annular seal mounting members are positioned above and below the seal and have surfaces to matingly engage the seal member. The mounting elements are arranged to move relative to one another. A pressure differential developed across the motor is communicated to the respective mounting elements to urge the elements toward one another and thereby compress the seal member therebetween to accommodate wear take-up on the seal member. An oil chamber above the upper mounting element communicates drilling fluid pressure inside the drill pipe to the upper mounting element. The pressure of the annular space below the motor housing is communicated to the lower mounting element by means of a lower chamber.

25 Claims, 5 Drawing Figures

ROTARY SHAFT SEAL

BACKGROUND OF THE INVENTION

1. Field of the Invention

This invention relates to a rotary shaft seal and, more particularly, to an annularly continuous, but axially variable seal for providing hydrodynamic lubrication between the seal and a rotating shaft. A system using differential pressures to keep the seal compressed as it wears is disclosed.

2. Description of the Background

This invention may be adapted for use with devices having tubular members which are supported for relative rotation by means of bearings contained within a lubricant chamber in an annular space between the members.

Such a tool is connected as part of a drilling string, and drilling fluid is circulated downwardly through a passageway formed by the tubular members and upwardly within the annulus between the tool and well bore. Thus, one such member often comprises a housing or case suspended from the lower end of the string, while the other comprises a hollow shaft rotatably supported by the housing and suspending a bit on its lower end. A motor, such as a turbine, is often disposed within the annular space between the housing and shaft for rotating the shaft and thus the bit without the necessity for transmitting torque from the surface to the housing through thousands of feet of drilling string. The passageway thus includes the annular space in which the turbine is disposed and which is connected by ports through the shaft to the bore of the shaft leading to the bit at its lower end. Typically in such tools, the housing is connected at its upper end to the drill string, and the shaft is caused to rotate with respect to the housing by means of the motor therebetween, whereby spiral blades or the like carried about the tubular shaft cause a reduction of pressure of drilling fluids as it passes through the blades and turns the blades. As in the case of a turbodrill, the motor often comprises turbine blades on the shaft and tubular members within the annular space between them. The drilling fluid which is circulated through the motor is confined for passage out through the bit.

Due to the drop in pressure across the turbine section and the bit, there is a substantial pressure differential across the seal means of drilling tools of this type. It is well known that a rotary seal means separating pressure in this manner is subject to considerably greater wear than one merely separating fluids at the same pressure. The problem of wear is even more serious in this environment due to abrasive particles in the drilling fluid which find their way between the surfaces of the seal means and the engaged tubular members. Another factor in seal wear is the severe axial and radial vibrations encountered in drilling boreholes through earth formations.

Unless protected therefrom, the bearings mounted in the annular space are also damaged by the abrasive particles in the drilling fluid. Since bearing replacement requires the raising and lowering of the drill string at great expense, efforts have been made to isolate the bearings from the abrasive drilling fluid by containing them in a lubricant chamber formed at least in part by a pair of seal means in the annular space. However, if one or both of these seal means also functions as a pressure separation element, it rapidly becomes worn and permits the abrasive drilling fluids to enter the lubricant chamber.

Because of the detrimental environment encountered by rotating motor parts positioned in a borehole drilling operation, many of the research efforts concerning the development of downhole "mud" motors for use in downhole drilling operations have been concerned with the protection of bearing and sealing moving surfaces from the abrasive effect of drilling fluids commonly referred to as drilling "mud." The following United States patents are particularly concerned with this problem: U.S. Pat. Nos. 3,659,662; 3,666,333; 3,971,450; 4,019,591; 4,222,445; 4,256,189; and 4,260,032. These patents deal with the problem of protecting bearing surfaces or the like from the drilling mud by a variety of schemes.

U.S. Pat. No. 3,659,662 discloses a tool which is intended to overcome this problem by providing a system in which a labyrinth is provided within the annular space between the shaft and housing. The shaft is ported in such a manner that the pressure drop is taken across the labyrinth and the pressure is equalized across the seal means forming the lubricant chamber in which the bearings are contained. However, if the passages through the labyrinth are small, they tend to be become clogged by the particles in the drilling fluid, thereby decreasing the cooling effect; and, if they are sufficiently large to pass a large volume of drilling fluid, the drilling efficiency of the bit is lowered considerably. Furthermore, even if the labyrinth is to be replaced by a third seal means of a non-leaking type, as disclosed in U.S. Pat. No. 3,971,450, it might still be subject to damage by the tendency of particles in the drilling fluid to enter between the sealing faces.

U.S. Pat. No. 3,666,333 incorporates a number of rather complex features in an attempt to solve this problem. This patent shows upper and lower seal systems located above and below the bearings and comprised of grease and oil filled chambers to prevent the entry of borehole fluids into the bearings. In addition, a labyrinth of mating annular parts are positioned above the upper sealing system to further impede the flow of drilling fluids, under the higher pressure of the drill pipe bore, from entering the rotating bearings and surfaces of the drilling motor.

Many devices such as that shown in U.S. Pat. No. 3,971,450 utilize seals having irregular configurations which, when unconfined in their assembly in the well tool, are subject to extrusion and deformation due to the heat and pressures developed in the borehole. These seals deteriorate and become ineffective to protect the moving parts from the borehole environment.

U.S. Pat. No. 4,222,445 uses a buffer fluid to protect a lubricant chamber. However, failing to take into account other important problems such as seal wear, the ability of this sealing system to protect the bearings is short lived.

Many approaches to this problem have simply attempted to use brute force, i.e., using a large seal area under high compression such as is shown in the lower seal of U.S. Pat. No. 4,019,591. This approach provides an initial seal but because of high friction and ensuing heat scorching of the seal, the seal surface wears and begins to leak lubricant.

U.S. Pat. Nos. 3,449,021; 2,867,462; and 3,831,954 deal with slanted sealing surfaces between tubular members. U.S. Pat. No. 3,449,021 illustrates such a seal for use between relatively rotating surfaces. However, the sealing contact surface against the rotating element is along a rather narrow band which in the configuration illustrated is not suited for adaptation to the environment of a borehole drilling apparatus. In addition, the harsh and inaccessible environment of the borehole renders it important to provide an effectual sealing surface that can be compensated for wear to avoid the necessity of early and frequent replacement. The above patents directed to slanted sealing surfaces all utilize irregularly shaped or nonconfined sealing members which would be deformed under the conditions in which the present invention is practiced. Further, the seals are not compensated for wear to provide a relatively long sealing life.

The characteristics of lubrication of hydrodynamic seals have been studied by the inventor and reported in several articles. Kalsi, M. S. and G. A. Fazekas, "Feasibility Study of a Slanted 'O-ring' as a High Pressure Rotary Seal," ASME Paper No. 72-WA/DE-14 (1972); Kalsi, M. S., "Elastohydrodynamic Lubrication of Offset O-Ring Rotary Seal," ASME Paper No. 80-C2/Lub-7 (1980) and in a dissertation of the same title submitted to the University of Houston in 1975.

The art has long sought a new and improved rotary shaft seal which will provide a simple but effectual seal in an environment of abrasive fluids while overcoming the difficulties and problems outlined above. The present invention overcomes these difficulties and provides a desirable sealing system by incorporating a continuous, axially variable hydrodynamic sealing surface between the shaft and housing of a downhole motor. Such a sealing system operates efficiently with a pressure differential across the seal and at a high temperature. Further, such a system provides a means for compensating for wear on the seal so as to maintain a seal of high integrity.

SUMMARY OF THE INVENTION

The present invention is directed to a rotary shaft seal utilizing a sealing member arranged in an annularly continuous, but axially variable path between relatively rotating parts. Preferably, the seal is of a slanted O-ring or multiple convolution configuration. Upper and lower seal contacting members have surfaces matingly engaging the surfaces of the sealing member, preferably slanted surfaces or surfaces with multiple convolutions. The upper and lower seal contacting members are arranged for relative movement to compress the sealing member therebetween.

Differential pressures are generated by the arrangement of tool elements to move at least one of the seal contacting members toward the other.

In a presently preferred embodiment, the unsupported area principal is employed to generate a differential pressure by providing a multiplication of differential pressure forces acting to compress the seal contacting members to cause the seal to fill the groove within which it is carried as the seal wears. Additionally, a spring biasing member urges the seal contacting members to compress the seal during low differential pressure situations encountered during starting and stopping of the motor. This additional biasing minimizes or prevents otherwise considerable leakage of lubricant from the bearing and sealing sub during these times.

The arrangement of parts causing the seal carrying groove to compress the seal under a controlled pressure provides a system which does not rely on the original shape of the seal being maintained. The seal, whatever its original shape, is compressed within the confines of the seal contacting members and thus assumes the shape afforded by such members.

Another feature of the present invention includes the use of a lubricant contained in a chamber above the sealing member, wherein the high pressure of a pressure differential is communicated to the lubricant which in turn acts on one of the seal contacting members to move that seal contacting member toward the other and thereby compress the seal.

Still another feature of the present invention includes a lower chamber located below the lower seal contacting member and filled with a highly viscous material such as grease for impeding the encroachment of environmental fluids into the sealing system while permitting the pressure of environmental fluids to impinge upon the lower seal contacting member.

BRIEF DESCRIPTION OF THE DRAWINGS

Other features and intended advantages of the invention will be more readily apparent by reference to the following detailed description in connection with the accompanying drawings wherein.

While the invention will be described in connection with a presently preferred embodiment, it will be understood that it is not intended to limit the invention to that embodiment. On the contrary, it is intended to cover all alternatives, modifications and equivalents as may be included within the spirit of the invention as defined by the appended claims.

DESCRIPTION OF THE PREFERRED EMBODIMENT

Figure 1:
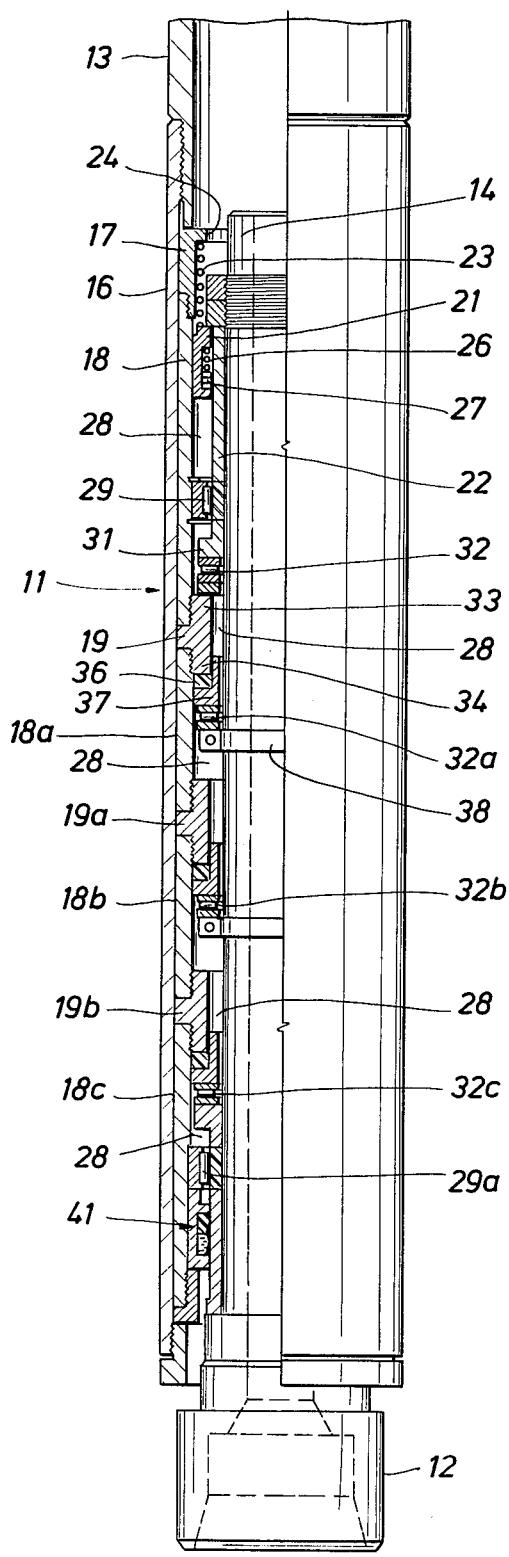
FIG. 1 illustrates a vertical, partial cross-sectional view of a well tool for use in a downhole drilling system into which a lower shaft seal in accordance with the present invention may be incorporated.

Referring first to FIG. 1 of the drawings, there is illustrated a bearing and sealing sub-section 11 suitable for incorporation into a drill string. In a typical drill string assembly, a bit sub would be connected at 12 to the lower end of sealing sub 11. Sub 11 would be connected below housing 13 of a motor sub, preferably a deep oil well motor such as illustrated and described in U.S. Pat. No. 3,966,369. Motor sub 13 would normally include a turbine motor, a positive displacement motor or the like having an output shaft (not shown) connected to shaft 14 rotatably positioned within housing 16 of sub 11.

Housing 16 is illustrated having an annular upper end sleeve 17 assembled within the housing bore and connected at its lower end to spacing sleeve 18. Bearing collar 19 is connected to the bottom of spacing sleeve 18. An alternating depending vertical arrangement of spacing sleeves 18, 18a, 18b and 18c and bearing collars 19, 19a and 19b is shown positioned in the bore of housing 16 to carry the elements comprising the main portion of sub 11.

These elements further include movable piston 21 slidably positioned between spacing sleeve 18 and wear sleeve 22 on the outer surface of shaft 14. Spring 23 is arranged between the top end of piston 21 and annular inwardly facing shoulder 24 formed on upper end sleeve 17. An annular recess on the inner wall of piston 21 carries annular spring 26 for compressing annular packing assembly 27 positioned in the annular recess of piston 21. O-rings (not shown) on the outer side wall of piston 21 sealingly engage the inner bore of spacing sleeve 18.

A series of interconnected chambers and annular spaces 28 formed between housing 16 and shaft 14, are filled with a lubricating oil to provide an oil bath for the bearings housed in sub 11. Radial bearing assembly 29 is illustrated between wear sleeve 22 and spacing sleeve 18 to provide for concentric mounting of shaft 14 within housing 18 and to accommodate lateral forces acting on sub 11 such as are caused by hole deviations acting against the sub. The lower end of wear sleeve 22 has an outwardly projecting annular shoulder portion 31 which is arranged to hold thrust bearing 32 against upwardly projecting portion 33 of bearing collar 19. Downwardly projecting portion 34 of bearing collar 19 is arranged to form the top of a circumferential chamber for housing non-compressible thrust ring 36. The lower and inner wall portions of the circumferential chamber are provided by an "L" shaped annular ring member 37 riding on top of thrust bearing 32a. The bottom of thrust bearing 32a is supported by rotor shaft collar 38 clamped about shaft 14 and having a shoulder portion extending into the annular space between shaft 14 and housing 16 to hold bearing 32a in its vertical position in the bearing and seal assembly of sub 11.

Thrust bearings 32b and 32c are arranged in a similar manner to the arrangement described above for locating bearing 32a in the assembly. Lower radial bearing assembly 29a is illustrated between shaft 14 and housing 16. In the bearing arrangement described above, uppermost thrust bearing 32 is arranged to carry thrust forces acting downwardly on shaft 14 relative to housing 16. This would occur when the drill string is positioned above the bottom of the hole. When the drill bit is resting on the bottom and weight is placed on the drill string, thrust bearings 32a, 32b and 32c carry the upward loading on shaft 14. The bearing and seal arrangement described above is shown in greater detail in U.S. Pat. No. 4,086,788.

Figure 2:
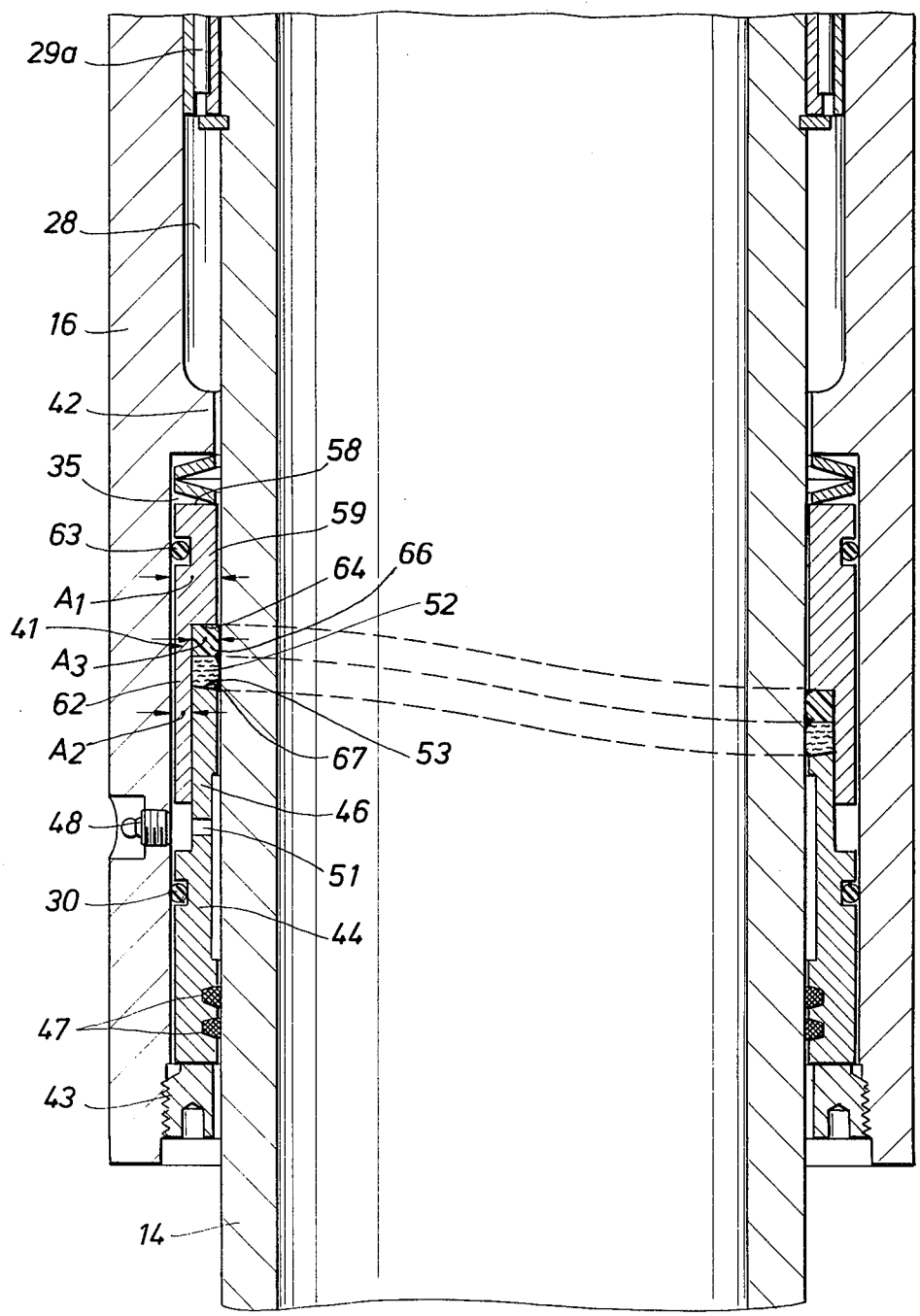
FIG. 2 illustrates a detailed vertical cross-sectional view of the lower shaft seal area of FIG. 1 and incorporating a rotary shaft seal in accordance with the present invention.
Figure 3:
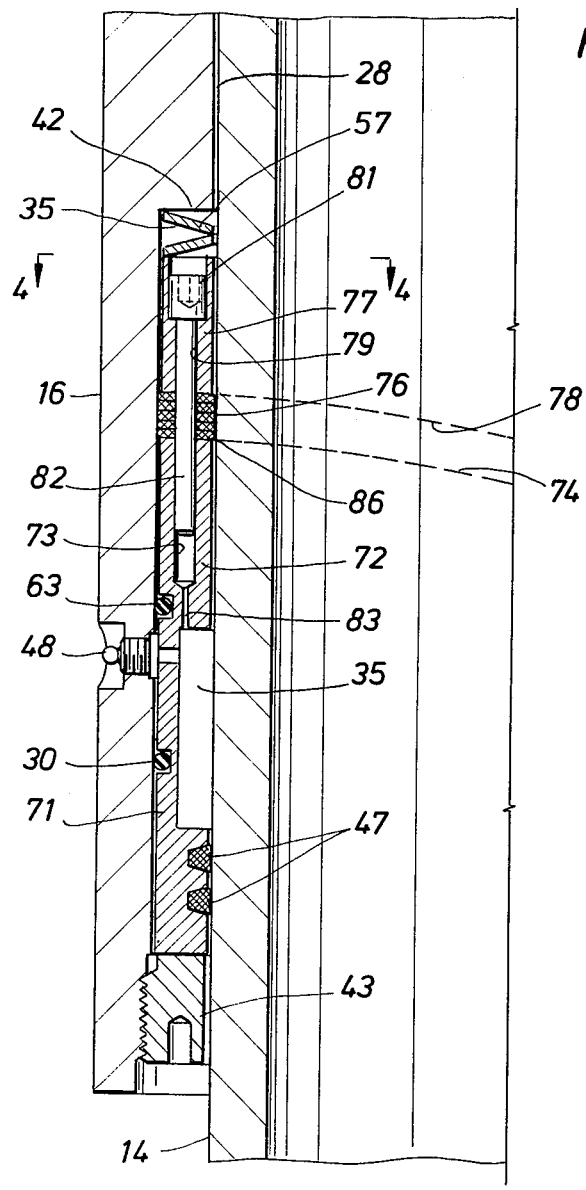
FIG. 3 illustrates a vertical cross-sectional view of a portion of the lower shaft seal area of FIG. 1 and incorporating an alternative embodiment of a rotary shaft seal in accordance with the present invention.

The lower shaft seal assembly generally indicated by the reference numeral 41 and which is the subject of the present invention is illustrated and described in greater detail with respect to FIGS. 2 and 3 of the drawings. Referring now to FIG. 2 of the drawings, lower shaft seal assembly 41 is illustrated between shaft 14 and housing 16 below radial bearing 29a. One of annular chambers 28, containing the oil for lubricating the bearing assembly, is illustrated extending below bearing 29a and into fluid communication with the upper end of lower seal assembly 41. Annular space 35 for mounting the lower seal assembly is formed between shaft 14 and housing 16 and terminates at its upper end at inwardly projecting shoulder 42 on housing 16. Annular abutment ring 43 is threadedly received in the lower end of housing 16 to form the lower end of annular space 35 for housing seal assembly 41.

Lower seal support member 44 is comprised of an annular sleeve having upwardly extending support portion 46, support member 44 being sized for reception in the lower end of annular space 35. The lower end of support member 44 rests on top of abutment ring 43. A pair of annular felt seal rings 47 are illustrated spaced apart longitudinally on the inner facing wall of support member 44 for providing a barrier against the encroachment of drilling fluids into the lower end of seal assembly 41. While preventing the encroachment of such fluids in conjunction with a viscous material such as grease positioned thereabove, the felt seals are not sufficient to prevent the transmittal of pressure from the borehole annulus into the lower end of annular space 35. Port 48 is provided through the wall of housing 16 to accommodate the insertion of grease into annular space 35 and is arranged with a fitting to seal the port closed when grease is not being injected. The grease is communicated to the inner side of support member 44 by means of port 51 in the wall of upwardly extending support portion 46. O-ring seal 30 is positioned in a groove on the outer wall of support member 44 between member 44 and the inner bore of housing 16. Upper surface 53 of support portion 46 is contoured to matingly conform to the lower surface of lower seal member 52. Seal member 52 and matingly contoured surface 53 are characterized by an axial variation, and preferably are slanted or multiply convoluted.

Referring now to the upper end of seal assembly 41, annular spring array 57, e.g., Beleville springs, is positioned in annular space 35 just below shoulder 42. The bottom of spring array 57 acts downwardly upon top surface 58 of upper annular support member 59. Support member 59 has downwardly extending annular portion 62 which extends about the inner wall of the annular space and beyond seal 52, with the lower end of annular portion 62 being unsupported therebelow and in communication with the fluid pressure in the annular space below or outside housing 16. Annular O-ring seal 63 is positioned in a groove around the outer wall of upper support member 59 to seal the lower end of portion 62 from the higher differential pressure of oil in chamber 28. Lower surface 64 is formed on the bottom side of a shoulder formed on the inner wall of upper support member 59. Surface 64 is arranged to matingly conform to the upper surface of upper seal member 66. Seal member 66 and surface 64 are characterized by an axial variation, and preferably are slanted or multiply convoluted. Accordingly, in a presently preferred embodiment, surfaces 64 and 53 are parallel and provide an annular slanted groove in which is housed lower annular seal 52 and upper annular seal 66. In the embodiment illustrated in FIG. 2, upper seal 66 is illustrated as an O-ring and lower seal 52 is illustrated as a braided layer of packing. Because of the compressive effect of the seal assembly described above, the seal materials will be compressed to fill the groove formed by upper and lower surfaces 64 and 53 respectively and the outer wall of shaft 14 and vertical inner wall of portion 62. Thus, regardless of the specific shape of packing or seal used in the assembly, the seal will be deformed into the shape of the groove. Additionally, the seals are constructed so that radius 67 is formed by the inner edges of the vertical sealing surfaces of seal members 52 and 66 facing shaft 14.

Referring now to FIG. 3 of the drawings, an alternative embodiment of seal assembly 41 is illustrated. Annular space 35 between housing 16 and shaft 14 is arranged between upper shoulder 42 and lower abutment ring 43 as in FIG. 2. Lower support member 71 also similarly has felt seals 47 arranged on its inner wall to engage the outer surface of shaft 14. O-ring 30 is positioned on the outer wall of lower support member 71 to seal against the bore of housing 16. Grease injection port and fitting 48 provides for the filling of annular space 35 at the lower end of the seal assembly with a viscous material. Lower support member 71 has an enlarged annular portion 72 at its upper end which is sized to fill the space between the housing 16 and shaft 14.

Figure 4:
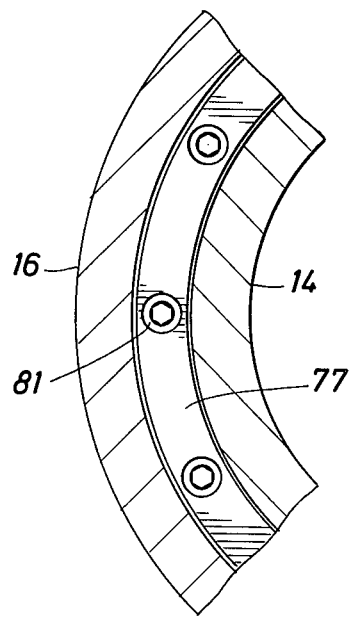
FIG. 4 illustrates a partial top view of the upper support member 77 of FIG. 3.

Vertical holes 73 are formed in a radial series about upper end portion 72 of support member 71. The upper surface of enlarged portion 72 has a surface 74 for matingly engaging an annular sealing member 76. These surfaces are characterized by an axial variation, and preferably they are slanted or multiply convoluted. Upper support member 77 is positioned above seal member 76 and has lower surface 78 for matingly contacting the top of seal member 76. An array of springs 57 is positioned between shoulder 42 and the top of upper support 77. A radial series of vertical holes 79 is also formed in upper support 77 and are aligned with vertical holes 73 in upper portion 72 of lower support member 71. The top portion of holes 79 is enlarged to receive head 81 of pin 82 sized for reception within aligned holes 79 and 73. Vertical passage 83 connects the bottom of each hole 73 with annular space 35 in the lower portion of the seal assembly. Oil fills the chamber or spaces 28 above upper support 77. FIG. 4 of the drawings illustrates a top view of upper support 77. Heads 81 of pins 82 are illustrated in the assembled position within the radial series of vertical holes 79.

Seal 76 is comprised of layers of suitable sealing material arranged in a continuous annular configuration with an axial variation, preferably slanted or multiply convoluted, to fit within the groove defined by surfaces 78 and 74 on upper and lower support members 77 and 71, respectively. Radius 86 is formed on the top and bottom inner facing edge of seal 76 to accommodate the lifting of such inner facing edge of the seal by the hydrodynamic force of lubricating oil moving past the seal.

Figure 5:
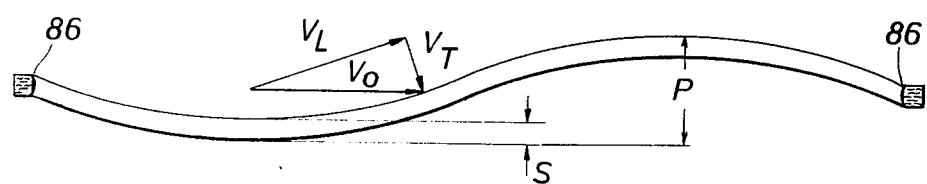
FIG. 5 illustrates a diagramatic view of an offset O-ring seal with a corresponding velocity diagram.

The hydrodynamic effect of the lubricating oil film on the seal is appreciated more clearly by reference to FIG. 5 of the drawings. FIG. 5 is a schematic representation of the circumferentially developed path of seal 76 of FIG. 3 moving in relation to shaft 14 during one revolution of the shaft. Because of the axial variation of the seal, e.g., the slanted configuration of seal 76 with respect to the path of rotation of shaft surface 14, the seal, having a vertical width S, moves through a path having a vertical width P during one revolution of shaft 14. As the shaft rotates relative to the seal, lubricant tends to move in a substantially horizontal direction about the shaft. The horizontal velocity being applied to the oil is represented by the line $V_o$ in FIG. 5. The velocity represented by $V_o$ can be divided into two vector components, i.e., $V_L$ which is the velocity moving the oil in a lateral direction along the path of the seal and $V_T$ which is the velocity acting transversely to the side wall of seal 76. Component $V_T$ causes oil, in conjunction with the radius 86 at the edges of seal 76 to lift the seal and flow under the seal thereby forming a thin layer of lubricating oil between seal 76 and shaft 14. In addition, because there is a pressure differential across seal 76 due to the pressure developed across the downhole motor, e.g., there is a net downward force on the oil moving back and forth across the seal as the shaft moves relative thereto. The back and forth movement of the oil is due to the undulating or sinusoidal path taken by the seal relative to the shaft having the effect of alternately placing portions of the shaft above and below the seal. The effect of this seal system and the hydrodynamic flow generated with respect thereto is to provide a lubricating surface at all times between seal 76 and shaft 14 which tends to reduce the temperature of the seal as well as to lubricate the rotating shaft, thus preventing the seal from scorching and becoming brittle. Prevention of scorching and brittleness greatly reduces wear on the seal. The net flow of oil in one direction also aids the temperature reducing function of the system by carrying heat away from the sealing surface.

When a drilling tool having a seal assembly in accordance with the present invention as described above is operated, a pressure differential is developed across the tool whereby a higher pressure exists in the section of the tool above the drill bit than exists below the bit. The higher pressure in this tool is communicated to the upper end of bearing and sealing sub 11 (FIG. 1) by means of piston 21 at the upper end of sub 11. This pressure is carried by the lubricant in chambers 28 throughout sub 11 to the lower end of the sub bordering seal assembly 41. Referring now to FIG. 2, this pressure is passed to the upper end of upper support member 59 and acts downwardly across the area $A_1$. This downward force is passed to the top surface of seals 52 and 66. Bottom support member 44 is held against downward movement by abutment ring 43, thus compressing the seal between upper and lower support members 59 and 44, respectively. As the inner facing surfaces of seals 52 and 66 wear, the predictable force between the support members is appropriately closing the groove defined by surfaces 53 and 64 to continuously maintain the seal confined as it wears down and to press the seal into sealing engagement with the shaft and upper support member.

The differential pressure described above, acting to force the support members together, is further enhanced by an unbalanced area effect, which results from the configuration of upper and lower seal supports and their cooperative relationship in the assembly. As discussed above, a downward force on top of the seals is represented by a higher pressure $P_H$ in the tool bore acting across area $A_1$ as illustrated in FIG. 2. The downward pressure is the product of $A_1 + P_H$. The lower pressure $P_L$ of the borehole annulus acts across area $A_2$ on unsupported portion 62 depending from support member 59. The hydraulic force thus acting upwardly on upper support member 59 is $P_L \times A_2$. A third upwardly acting force acting upon support member 59 is represented by an unknown pressure $P_s$ acting across the seals or areas $A_3$ also represented by $A_1 - A_2$. A simple force diagram can be drawn with examples of pressures and areas to show that the pressure $P_s$ acting across the seals is always greater than the pressure of the lubricant in chamber 28 above. The pressure $P_s$ across the seals is calculated as $P_s = (P_H \cdot A_1 - P_1 \cdot A_2)/(A_1 - A_2)$. This unsupported area effect thereby enhances the wear compensating feature of the system. The seals not only last longer but uncontrolled leakage of oil past the seal at a rate greater than that of the desired leakage rate is prevented.

The portion of the seal assembly below seals 66 and 52 is filled with a highly viscous material such as grease, which, in conjunction with felt seals 47, prevents drilling fluids from passing into the seal area. Felt seals 47 also become impregnated with the grease. The grease below the seals together with the net flow of oil downwardly as described above, prevents drilling fluids from encroaching into the assembly from below. The system, however, does permit the pressure of drilling fluids in the borehole annulus to be transmitted to the grease chamber below seals 66 and 52.

When the tool of FIG. 1 is stationary, is commencing or is ceasing its rotation, it is likely that the pressure differential relied upon to compress the seals will not be sufficiently high to be operative to prevent leakage of lubricant past the seals. Spring array 57 thus acts downwardly on upper support member 59 during periods of little or no rotation, in addition to holding the components in assembly.

The embodiment illustrated in FIG. 3 operates similarly to the embodiment of FIG. 2 as described above except that pins 82 represent the unsupported area which provides the multiplying effect of pressure differential across seal 76.

The foregoing description of the invention has been directed primarily to a particular preferred embodiment in accordance with the requirements of the patent statutes and for purposes of explanation and illustration. It will be apparent, however, to those skilled in the art that many modifications and changes in the specifically described and illustrated apparatus and method may be made without departing from the scope and spirit of the invention. For example, while the disclosure of the system has been described primarily with regard to a slanted seal member, it may be appreciated from the present description and illustrations that any seal member having a configuration with sufficient axial variation, e.g., multiple convolutions, to produce the desired hydrodynamic lubrication may be substituted for the slanted seal of the illustrated embodiment. Further, various changes in the size, shape and materials as well as the details of the illustrated embodiment will be evident to those skilled in the art without departing from the present invention in its broadest aspects. Finally, although this seal device was described with relation to use in a drilling tool, it is adaptable for use in any device employing a rotary seal. Therefore, the invention is not restricted to the particular form of construction illustrated and described, but covers all modifications which may fall within the scope of the following claims.

It is Applicant's intention in the following claims to cover such modifications and variations as fall within the true spirit and scope of the invention.

What is claimed is:

1. A rotary shaft seal system for sealing an annular space between a rotating shaft and its housing, comprising:
    annular seal means having upper and lower engaging surfaces and having an axially variable configuration about a rotating shaft so that one sealing surface of said seal means slidably engages said rotating shaft;
    first and second means for matingly engaging the upper and lower engaging surfaces of said seal means and arranged to permit relative longitudinal movement with respect to one another;
    means actuated by a differential fluid pressure for biasing said first and second engaging means toward one another; and
    means for substantially preventing contact of said seal means with the fluid in the environment of said housing.

2. The seal system of claim 1 wherein said means for preventing contact comprises a first fluid chamber positioned in the annular space between said shaft and housing above said first engaging means and having a fluid within said chamber and means for communicating the pressure of said fluid in said first chamber to said first engaging means.

3. The seal system of claim 2 further comprising means for communicating the pressure of the environment within the interior of said housing to said fluid in said first chamber.

4. The seal system of claim 2 further comprising a second chamber positioned in the annular space between said shaft and housing below said second engaging means and having a viscous material with said second chamber.

5. The seal system of claim 4 further comprising barrier means at the lower end of said second chamber for admitting pressure from the environment below said housing into said second chamber but at the same time preventing the entry of fluids from the environment below said housing into said second chamber.

6. The seal system of claim 1 wherein said biasing means comprises differential areas on the top and bottom surfaces of said one of said first and second engaging means to provide an unsupported area thereon for urging the engaging surface of at least one of said engaging means against the matingly engaging surface of said seal means.

7. The seal system of claim 6 further comprising spring means for constantly biasing the matingly engaging surface of said one of said engaging means against the matingly engaging surface of said seal means.

8. A rotary seal system for use in forming a seal between first and second members rotating relative to one another, comprising:
    annular slanted sealing means arranged in an annular slanted path between said first and second members and having substantially flat sealing surfaces engaging said first and second members;
    upper and lower annular support members positioned above and below said sealing means, said annular support members each having annular slanted surfaces matingly engaging the annular slanted sealing means;
    means actuated by a differential fluid pressure for urging at least one of said upper and lower annular support members toward the other; and
    means for substantially preventing contact of said seal means with the fluid in the environment of said members.

9. The seal system of claim 8 further comprising a radius formed on the edges of at least one of said flat sealing surfaces.

10. The rotary seal system of claim 8 wherein said means for substantially preventing contact comprises a chamber containing a lubricating fluid within which said sealing means is positioned.

11. The rotary seal system of claim 10 wherein said seal means separates said chamber into a high pressure side and a low pressure side, and wherein a positive flow of lubricating fluid is maintained across said sealing means.

12. The rotary seal system of claim 8 wherein said seal means is in fluid communication on a high pressure side with a first chamber containing a lubricating fluid and is in fluid communication on a low pressure side with a second chamber containing a fluid having a viscosity greater than said lubricating fluid and wherein a positive flow of lubricating fluid is maintained across said sealing means.

13. The rotary seal system of claim 12 further comprising means for communicating the pressure of the environment within the interior of said members to said fluid in one of said chambers.

14. The rotary seal system of claim 12 further comprising means for communicating the pressure of the environment on the exterior of said members to said fluid in one of said chambers.

15. The rotary seal system of claim 12 further comprising barrier means between said fluids in said chambers and the fluid in the environment of said members, said barrier means capable of communicating pressure but substantially preventing communication of the fluid in the environment into said chambers.

16. In a borehole tool suitable for incorporation in a drill string in which a drilling fluid is pumped down the bore of the drill string and out the bottom of the drill string, said tool including a housing capable of incorporation on the lower end of the drill string, a rotating shaft carried within the housing, bearings positioned between the housing and the shaft for supporting the rotary movement of the shaft within the housing, the bearings being maintained within an oil bath, and a shaft rotation system connected to the shaft to cause the shaft to rotate within the housing when drilling fluid is pumped downwardly through the drill string, a sealing system for sealing the lower end of the housing and shaft to prevent drilling fluids from entering into the oil bath, a seal system comprising:
- annular seal means having an axially variable configuration about said rotating shaft so that one surface of said seal means slidably engages said rotating shaft;
- first and second means engaging the top and bottom surfaces of said seal means and arranged for relative longitudinal movement with respect to one another;
- means actuated by a differential fluid pressure urging said first and second engaging means toward one another; and
- means for substantially preventing contact of said seal means with the fluid in the environment of said housing.

17. The seal system of claim 16 wherein said seal means is arranged in an oblique, slanted path about said rotating shaft.

18. The seal system of claim 16 wherein one of said first and second engaging means is an annular ring means vertically movable between said housing and shaft means and having a portion arranged to matingly engage one of said top and bottom surfaces of said seal means, said annular ring means having one of its top and bottom surfaces forming an unsupported area to urge it in the direction of the unsupported area, for biasing said portion of said annular ring means toward its mating engagement with one of said top and bottom surfaces of said seal means.

19. The seal system of claim 18 wherein said annular ring means has a surface thereon for matingly engaging the annular seal means.

20. The seal system of claim 18 further comprising an oil filled chamber adjacent said seal means, with said annular ring being positioned between said chamber and said seal means, and means for imparting the pressure of drilling fluid within the drill string to said oil filled chamber.

21. The seal system of claim 20 further comprising spring means in said chamber for imposing a longitudinal biasing force on said annular ring.

22. The seal system of claim 20 further comprising annular barrier means interposed between said housing and shaft and longitudinally spaced from the other of said top and bottom surfaces and the bottom of said housing and a viscous fluid in the longitudinal space between said annular barrier means and said other of said top and bottom surfaces.

23. The seal system of claim 16 further comprising first and second chambers adjacent said first and second engaging means respectively, with said engaging means positioned between said chambers and said annular seal with lubricating oil in one of said first and second chambers and a viscous medium in the other of said first and second chambers having a viscosity greater than that of said lubricating oil.

24. The seal system of claim 23 further comprising means for maintaining said chamber with lubricating oil at a higher pressure than said chamber containing a viscous medium.

25. The seal system of claim 16 wherein one of said first and second engaging means is an annular sleeve having a surface for matingly engaging the other of said top and bottom surfaces, and further comprising annular barrier means positioned between said housing and shaft and spaced from said annular sleeve to form a chamber between said annular sleeve and barrier means with a viscous material in said chamber.

* * * * *